(12) United States Patent
Yokoyama et al.

(10) Patent No.: US 11,199,284 B2
(45) Date of Patent: Dec. 14, 2021

(54) RESIN PIPE JOINT

(71) Applicant: MIRAIAL CO., LTD., Tokyo (JP)

(72) Inventors: Makoto Yokoyama, Tokyo (JP); Seiya Tamaribuchi, Tokyo (JP)

(73) Assignee: MIRAIAL CO., LTD., Tokyo (JP)

( * ) Notice: Subject to any disclaimer, the term of this patent is extended or adjusted under 35 U.S.C. 154(b) by 408 days.

(21) Appl. No.: 15/763,983

(22) PCT Filed: Sep. 29, 2015

(86) PCT No.: PCT/JP2015/077624
§ 371 (c)(1),
(2) Date: Mar. 28, 2018

(87) PCT Pub. No.: WO2017/056203
PCT Pub. Date: Apr. 6, 2017

(65) Prior Publication Data
US 2018/0283590 A1 Oct. 4, 2018

(51) Int. Cl.
*F16L 47/02* (2006.01)
*F16L 43/00* (2006.01)
*F16L 41/02* (2006.01)

(52) U.S. Cl.
CPC ............. *F16L 47/02* (2013.01); *F16L 41/021* (2013.01); *F16L 43/008* (2013.01)

(58) Field of Classification Search
CPC ........ F16L 47/02; F16L 43/008; F16L 41/021
See application file for complete search history.

(56) References Cited

U.S. PATENT DOCUMENTS

| 4,070,044 A | * | 1/1978 | Carrow | ............... B29C 66/7394 |
| | | | | 285/133.11 |
| 5,090,743 A | * | 2/1992 | Obering | .................. B21C 37/29 |
| | | | | 285/133.21 |

(Continued)

FOREIGN PATENT DOCUMENTS

| DE | 102006034697 A1 | 2/2007 |
| JP | H05256391 | 10/1993 |

(Continued)

OTHER PUBLICATIONS

International Preliminary Report on Patentability on corresponding PCT application (PCT/JP2015/077624) from International Preliminary Examining Authority (JPO) dated Sep. 19, 2017.

(Continued)

*Primary Examiner* — James M Hewitt, II
(74) *Attorney, Agent, or Firm* — Klein, O'Neill & Singh, LLP (57) ABSTRACT

A resin pipe joint includes a tubular joint body portion having an internal flow path (P) for allowing a fluid to flow therein; and two or more welding end portions, which are respectively provided at two or more opening portions of the internal flow path (P), and which are configured to be welded while being butted against end portions of other resin tube members or end portions of other resin pipe joints.

(Continued)

The flow path cross-sectional area of the internal flow path (P) in the joint body portion is constant, at least in portions that are adjacent to the welding end portions and whose outer diameters are straight.

16 Claims, 8 Drawing Sheets

(56) References Cited

U.S. PATENT DOCUMENTS

| | | | | |
|---|---|---|---|---|
| 5,156,420 | A * | 10/1992 | Bokor | B29C 65/342 |
| | | | | 285/184 |
| 5,316,349 | A | 5/1994 | Rafeld | |
| 5,452,922 | A * | 9/1995 | Ziu | F16L 39/005 |
| | | | | 285/123.1 |
| 5,775,736 | A | 7/1998 | Svetlik | |
| 5,975,590 | A * | 11/1999 | Cowan | F16L 13/02 |
| | | | | 285/133.11 |
| 6,203,071 | B1 * | 3/2001 | Kingsford | F16L 43/008 |
| | | | | 285/18 |
| 2009/0243284 | A1 | 10/2009 | Klingel, Jr. et al. | |
| 2010/0133804 | A1 * | 6/2010 | Larkin | F16L 41/023 |
| | | | | 285/16 |
| 2011/0074145 | A1 | 3/2011 | Schwarzkopf et al. | |
| 2014/0020811 | A1 * | 1/2014 | Wermelinger | B29C 66/1142 |
| | | | | 156/60 |
| 2014/0069548 | A1 | 3/2014 | Hasegawa | |
| 2016/0153599 | A1 | 6/2016 | Yokoyama | |
| 2017/0307124 | A1 * | 10/2017 | Svetlik | B29C 66/114 |

FOREIGN PATENT DOCUMENTS

| | | |
|---|---|---|
| JP | H07156276 | 6/1995 |
| JP | H1194176 | 4/1999 |
| JP | 2001253950 A | 9/2001 |
| JP | 2003097766 | 4/2003 |
| JP | 2003247687 | 9/2003 |
| JP | 2006177513 | 7/2006 |
| JP | 2006266397 | 10/2006 |
| JP | 2007078069 | 3/2007 |
| JP | 2014025575 | 2/2014 |

OTHER PUBLICATIONS

International Search Report on corresponding PCT application (PCT/JP2015/080443) from International Searching Authority (JPO) dated Jan. 19, 2016.

International Preliminary Report on Patentability on corresponding PCT application (PCT/JP2015/080443) from International Preliminary Examining Authority (JPO) dated Jan. 30, 2018.

International Search Report on corresponding PCT application (PCT/JP2015/077624) from International Searching Authority (JPO) dated Dec. 22, 2015.

* cited by examiner

PRIOR ART

FIG. 8

PRIOR ART

RESIN PIPE JOINT

CROSS-REFERENCE TO RELATED APPLICATIONS

This application is the national phase entry, under 35 U.S.C. Section 371(c), of International Application No. PCT/JP2015/077624, filed Sep. 29, 2015. The disclosure of the International Application is incorporated herein by reference in its entirety.

FEDERALLY SPONSORED RESEARCH OR DEVELOPMENT

Not Applicable

TECHNICAL FIELD

This invention relates to a resin pipe joint comprising a tubular joint body portion comprising an internal flow path for allowing a fluid to pass therein; and two or more welding end portions respectively provided at two or more opening portions of the internal flow path. More particularly, this invention proposes a technique that can achieve good flowing of a fluid in an internal flow path.

BACKGROUND ART

Piping such as chemical liquid transporting lines and the like utilized in various industries may be formed by welding end portions of a resin pipe joint made of a thermoplastic resin or the like and end portions of resin tube members or other resin pipe joints to each other while butting the respective ends against each other, using a welding machine.

More particularly, for example, each of the resin pipe joint and the resin tube member or the like is held by each of a pair of clamp jigs of the welding machine in a posture where the end portion of the resin pipe joint and the end portion of the resin tube member or the like are opposed to each other.

Both of the end portions of the resin pipe joint and the resin tube member or the like held by the clamp jigs are heated by a heater or other heating device to melt their end portions, and in this state, the resin pipe joint and the resin tube member or like are brought close to each other to butt their end portions against each other by applying a required pressure and weld them.

Figure 7:
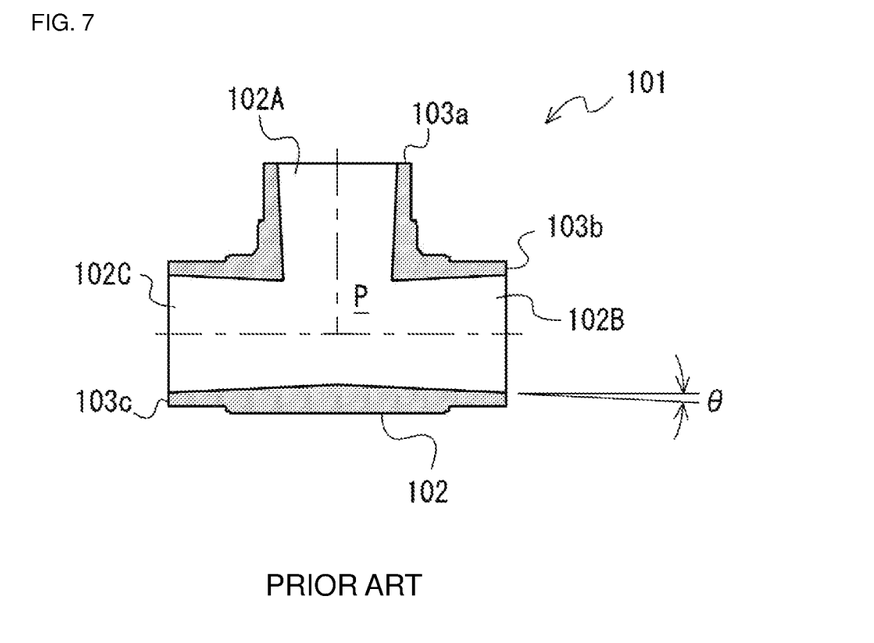
FIG. 7 is a cross-sectional view showing a conventional resin pipe joint, including a central axis of an internal flow path.

An example of such a conventional resin pipe joint is shown in a cross-sectional view in FIG. 7, for example. The resin pipe joint 101 shown in FIG. 7 includes a T-shaped joint body portion 102 having an internal flow path P extending in a substantially T-shape; and three welding end portions 103a-103c respectively provided on opening portions 102A-102C of the internal flow path P.

Figure 8:
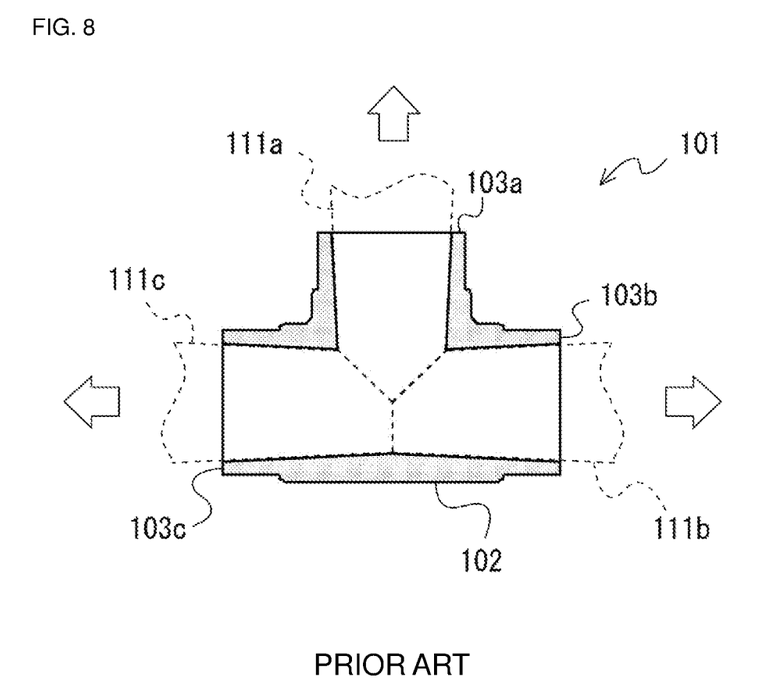
FIG. 8 is a view similar to FIG. 7, showing an arrangement manner and a drawing method of core pins when producing the resin pipe joint of FIG. 7.

In the production of the illustrated resin pipe joint 101 by injection molding, tips of three core pins 111a-111c for forming the substantially T-shaped flow path P, as shown by broken lines in FIG. 8, are arranged in a substantially T-shape in a mold cavity having a shape corresponding to the outer surface shape of the resin pipe joint 101 so as to bring the tips of them close to one another. After injecting a resin in the cavity and curing it to form a predetermined shape, each of the three core pins 111a-111c can be pulled out from each of the three welding end portions 103a-103c of the resin pipe joint 101, in the directions indicated by the arrows in FIG. 8, to form the resin pipe joint 101 provided with the T-shaped joint body portion 102.

SUMMARY OF INVENTION

Technical Problem

As exaggeratedly shown in FIGS. 7 and 8, the conventional resin pipe joint 101 as described above has portions which are adjacent to the welding end portions 103a-103c and whose outer diameters are straight, and portions tapered so as to gradually increase the flow path cross-sectional area of the internal flow path P toward each of the welding end portions 103a-103c, in order to ensure the pull-out property of the three core pins 111a-111c after the resin is cured, when producing the resin pipe joint. Typically, the taper angle θ of the pipe inner wall surface forming the internal flow path P of the conventional resin pipe joint 101 is from approximately 0.5° to 1.0° relative to the central axis of the internal flow path P, in the cross section shown in FIG. 7.

However, the resin pipe joint 101 with the joint body portion 102 having such a tapered internal flow path P causes a problem that the flow path cross-sectional area of the internal flow path P is greatly changed from the welding end portions 103a-103c toward the inside, and the flow rate of the fluid flowing in the internal flow path P will be also changed, thereby adversely affecting smooth flowing of the fluid.

Further, the resin pipe joint 101 may be used by cutting the welding end portions 103a-103c to a predetermined length for reasons of the shape of piping to be formed by using the pipe joint, an arrangement space of piping and the like. However, in this case, the inner diameters of the end portions after cutting the resin pipe joint 101 are smaller than the inner diameters of the original end portions, due to the tapered shape as described above. As a result, when the end portions of the resin pipe joint 101 and the resin tube member or the like are butted against each other as described above, steps due to the difference in inner diameter are generated at the welded portions between the resin pipe joint 101 and the resin tube member, and in addition, when the end portions having the difference in inner diameter are pressed together in the molten state during welding, the size of the portion where the inner surface of the welded portion rises toward the inner peripheral side, that is, the size of the inner bead, is increased. Consequently, there are also problems that liquid pool is generated at such welded portions of the piping, and the flow rate is also decreased.

An object of this invention is to solve such problems of the conventional resin pipe joint. The purpose of this invention is to provide a resin pipe joint that can prevent the adverse effect on the flowing of the fluid caused by the internal flow path of the pipe having the tapered shape in which the cross-sectional area of the flow path gradually increases toward each of the welding end portions.

Solution to Problem

The present inventors have found that when producing a resin pipe joint having for example a T-shaped internal flow path by means of injection molding, the resin pipe joint in which a flow path cross section of an internal flow path is constant at least in portions which are adjacent to welding end portions and whose outer diameters are straight can be molded by using two core pins consisting of a core pin extending through the two welding end portions aligned in the same straight line and a core pine extending through the remaining welding end portion of the internal flow path, or the like. That is, even if the end portions of the resin pipe joint are cut during the welding of the resin pipe joint to the resin tube or the like, it is possible to provide the resin pipe joint in which the cross-sectional shape of the internal flow path is always the same before and after any welded portion.

Under such findings, a resin pipe joint according to this invention comprises: a tubular joint body portion comprising an internal flow path for allowing a fluid to flow therein; and two or more welding end portions which are respectively provided at two or more opening portions of the internal flow path and which are welded while being butted against end portions of other resin tube members or end portions of other resin pipe joints, wherein the flow path cross-sectional area of the internal flow path in the joint body portion is constant at least in portions which are adjacent to the welding end portions and whose outer diameters are straight.

It is preferable that in the resin pipe joint according to this invention, the joint body portion comprises: a flow path branching portion that branches the internal flow path into two or more branches, a flow path bending portion that bends the internal flow path, or a flow path diameter changing portion that changes a diameter of the internal flow path; and two or more flow path extension portions that each extends linearly so as to communicate the internal flow path from the flow path branching portion, the flow path bending portion or the flow path diameter changing portion to each of the two or more welding end portions, wherein the cross-sectional area of the flow path is constant in each flow path extension portion where the outer diameter of the joint body portion is straight.

Here, it is preferable that in the above resin pipe joint, the joint body portion comprises the flow path branching portion or the flow path bending portion, and the flow path cross-sectional area is constant all over the flow path branching portion or the flow path bending portion and the flow path extension portions of the joint body portion.

Further, it is preferable that in the above resin pipe joint, the pipe inner wall surface of each flow path extension portion is formed in a straight line shape parallel to the central axis of the internal flow path at the flow extension portion, in the cross section including the central axis of the internal flow path.

It is suitable that in the above resin pipe joint, the resin pipe joint comprises a ratio of a length Le of the flow path extension portion along the central axis of the internal flow path to a pipe outer diameter De at the flow path extension portion of the joint body portion (Le/De) of from 0.29 to 2.4.

Further, it is preferable that in the above resin pipe joint, the joint body portion comprises a T-shaped flow path branching portion for branching the internal flow path into two branches, and the resin pipe joint comprises a ratio of a length Lt between the two welding end portions that are linearly communicated with the flow path branching portion via the two flow path extension portions to a pipe outer diameter De at the flow path extension portion of the joint body portion (Lt/De) of from 1.9 to 8.0.

In addition, the length Lt between the two welding end portions which are linearly communicated with the T-shaped flow path branching portion via the two flow path extension portions may be from 25 mm to 50 mm.

It is preferable that the resin pipe joint comprises a length Le of the flow path extension portion along the central axis of the internal flow path of 1 mm or more.

The resin pipe joint described above may comprise perfluoroalkoxy alkane (PFA), a perfluoroethylene-propene copolymer (FEP) or polyether ether ketone (PEEK).

Advantageous Effects of Invention

According to the resin pipe joint of this invention, fluctuation of the flow rate of the fluid flowing in the internal flow path can be suppressed to be small, because the flow path cross-sectional area of the internal flow path in the joint body portion is constant at least in the portions which are adjacent to the welding end portions and whose outer diameters are straight. Further, even if the end portions of the resin pipe joint are cut to shorten them, the pipe inner diameter does not change at least in the portions which are adjacent to the welding end portions and whose outer diameters are straight, whereby any difference in inner diameter is not generated at the welded portions of the resin pipe joint 101 to the resin tube members, so that it is possible to prevent formation of steps or large inner beads due to the difference.

As a result, any adverse effect on the flowing of the fluid in the internal flow path can be prevented to realize good flowing of the fluid.

DESCRIPTION OF EMBODIMENTS

Embodiments of this invention will be described below in detail with reference to the drawings.

Figure 1A:
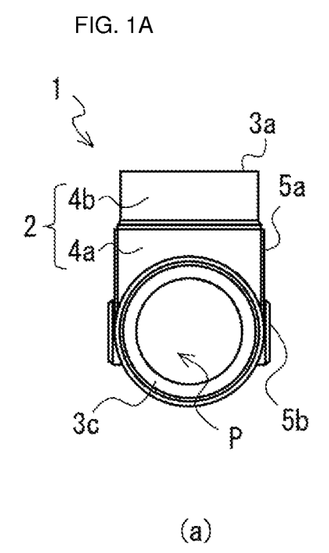
FIG. 1A is a side view showing a resin pipe joint according to one embodiment of this invention.
Figure 1B:
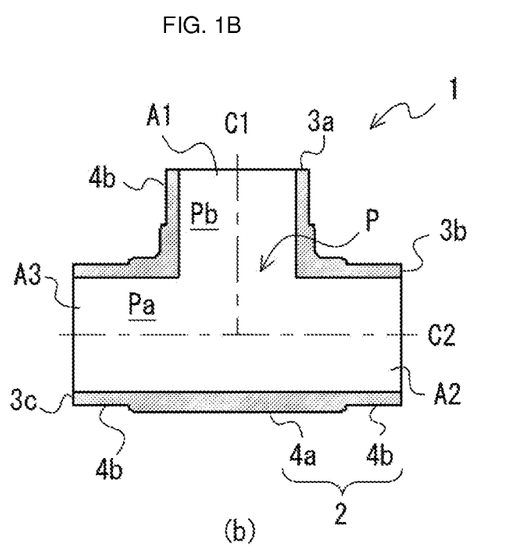
FIG. 1B is a cross-sectional view including a central axis of an internal flow path.
Figure 2:
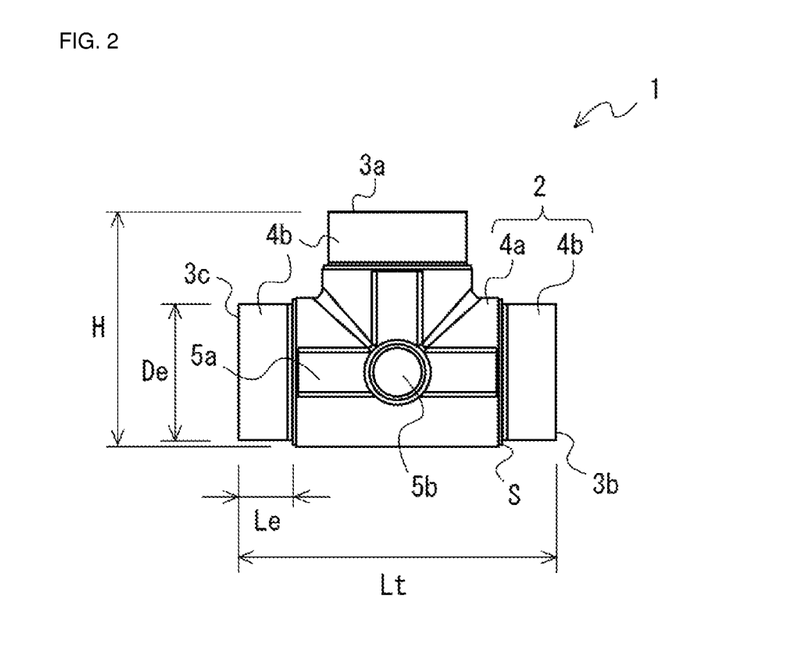
FIG. 2 is a plan view of the resin pipe joint shown in FIGS. 1A and 1B.
Figure 3:
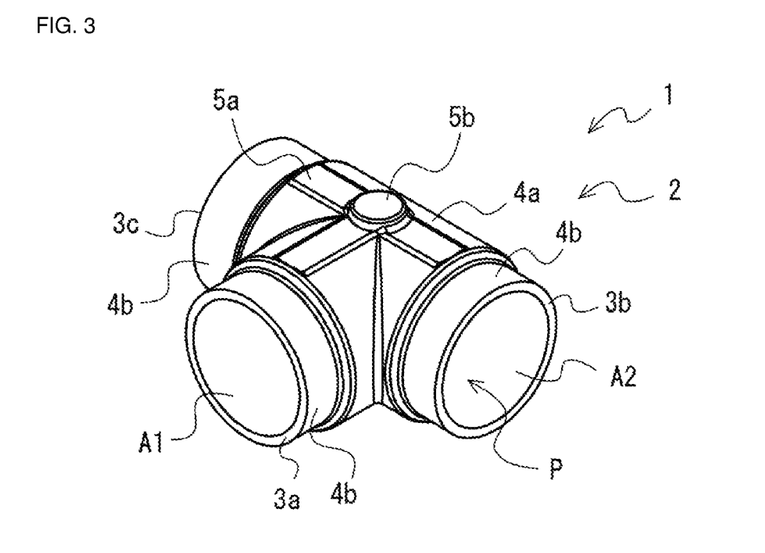
FIG. 3 is a perspective view of the resin pipe joint shown in FIG. 1.

A resin pipe joint 1 shown in FIGS. 1 to 3 includes a tubular joint body portion 2 having an internal flow path P forming a T-shape in a cross section shown in FIG. 1B; and welding end portions 3a-3c provided at three opening portions A1 to A3 of the internal flow path, respectively.

Here, when constructing piping including the resin pipe joint 1, the welding end portions 3a-3c of the resin pipe joint 1 are butted against and welded to end portions of resin tube members or other resin pipe joints having a straight pipe shape, curved pipe shape or the like (not shown), by using a welding machine (not shown) or the like. The welding can be carried out, for example, by holding the resin pipe joint 1 and the resin tube member or the like on a pair of clamp jigs of the welding machine, in such a posture that the end portion of the resin pipe joint 1 and the end portion of the resin tube member or the like are opposed to each other, and then bringing the resin pipe joint 1 and the resin tube member or the like close to each other while heating both end portions of the resin pipe joint 1 and the resin tube member or the like held by the clamp jigs to melt them by a heater or other heating device and butting their end portions against each other by applying a required pressure. Each of the welding end portions 3a-3c can provide a thickness of 1 mm or more as a welding margin.

Here, the internal flow path P in the joint body portion 2 serves to allow a liquid such as a chemical liquid or a gas or other fluid to flow therein so as to supply the fluid to a certain position, when using piping including the resin pipe joint 1. The internal flow path P according to the embodiment is composed of a base portion Pa linearly extending and a branched portion Pb vertically branching from the base portion Pa at the center in the path of extension of the base portion Pa.
The joint body 2 including the T-shaped internal flow path P also has a substantially T-shaped outer shape. More particularly, in the resin pipe joint 1, the joint body portion 2 is comprised of a flow path branching portion 4a that branches the internal flow path P into two branches; and three flow path extension portions 4b that each linearly extends so as to communicate the internal flow path P from the flow path branching portion 4a to each of the welding end portions 3a-3c. Each flow path extension portion 4b is a portion whose outer diameter is constant without any change and is straight in the extending direction thereof.

In the conventional resin pipe joint, the cross-sectional area of the flow path has a tapered internal flow path in which the cross-sectional area of the flow path is gradually increased toward the welding end portions, in order to ensure good pull-out property of the core pins during injection molding. However, in the resin pipe joint 1 according to the embodiment of this invention, the flow path cross-sectional area of the internal flow path is constant at least in each flow path extension portion 4b of the joint body portion 2, which is adjacent to the welding end portions 3a-3c and whose outer diameter is straight. Particularly in the embodiment, the pipe inner wall surfaces at the flow path extension portions 4b of the joint body portion 2 are formed in straight line shapes parallel to central axes C1, C2 of the internal flow path P in the flow path extension portions, in the cross section as shown in FIG. 1B, so that the pipe inner diameter and the flow path cross-sectional area are not changed but are constant at each flow path extension portion 4b.

Accordingly, the flow path cross-sectional area of the internal flow path P is constant at least near the welding end portions 3a-3c, whereby the fluctuation of the flow rate of the fluid in the internal flow path P can be suppressed. More particularly, in the resin pipe joint 1, the flow path cross-sectional area is constant not only in the flow path extension portions 4b, but also over the entire internal flow path P including the flow path branching portion 4, whereby the flow rate is not fluctuated over the entire internal flow path P, which is more suitable.
It should be noted that the flow path cross-sectional area means a cross-sectional area for a transverse section of the internal flow path P, that is, a cross section orthogonal to the central axis C1, C2 of the internal flow path P.

Further, the pipe inner walls forming the flow path extension portions 4b do not have the tapered shape as in the prior art and their inner diameters are constant, whereby even if the end portions of the resin pipe joint 1 are cut to shorten them, steps due to the difference in inner diameter are not generated at the welded portions to the resin tube members or the like produced so as to be consistent with the inner diameters of the end portions of the resin pipe joint 1 before being cut, so that generation of liquid pool at that portions or fluctuation of the flow rate can be prevented.

Although the shape of the flow path cross section of the internal flow path P herein is a perfect circle, it may be other shapes, such as an ellipse, an oval and the like, or polygons such as a rectangle and the like, although not shown. Even in such a flow path cross section, the cross-sectional area may be constant at least in the portions which are adjacent to the welding end portions and whose outer diameters are straight.

Figure 4:
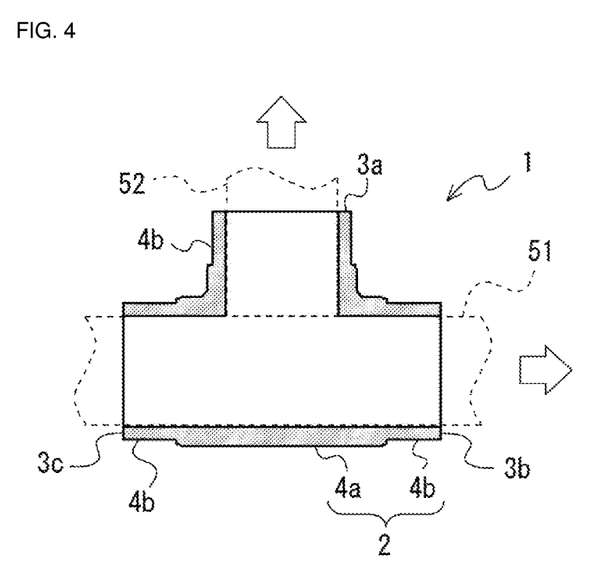
FIG. 4 is a view similar to FIG. 1 (b), showing an arrangement manner and a drawing method of core pins when producing the resin pipe joint of FIG. 1.

Such a resin pipe joint 1 can be produced such as by using two non-tapered core pins 51, 52 as indicated by broken lines in FIG. 4, or the like, in the injection molding. That is, using a columnar base portion core pin 51 arranged so as to extend through the base portion Pa of the internal flow path P and through the two welding end portions 3b and 3c aligned in the same straight line at the opening portions of the base portion Pa, and one columnar branching portion core pin 52 arranged so as to extend through the branched portion Pb of the internal flow path P and through the remaining welding end portion 3a, both the core pins 51 and 52 are placed in a cavity of an injection mold (not shown) while holding the tip of the branching portion core pin 52 on the side surface of the base portion core pin 51. After filling the cavity with a molten resin and curing the resin, the branching portion core pin 52 is first pulled out and the base portion core pin 51 is then pulled out to form the resin pipe joint 1.

It is preferable that the flow path extension portions 4b are shorter, in order to achieve easier pull-out of the core pins 51, 52 during the production of the resin pipe joint. Further, when constructing the piping using the resin pipe joint 1, it is also desirable to shorten the flow path extension portions 4b in order to deal with various piping shapes and arrangement spaces of the pipes.
From such viewpoint, a ratio of a length Le of each flow path extension portion 4b along the central axis C1 or C2 of the internal flow path P to a pipe outer diameter De at the flow path extension portion 4b of the joint body portion 2 (Le/De) is preferably from 0.29 to 2.4. If the ratio Le/De is less than 0.29, the length Le of the flow path extension portion 4b is smaller than the pipe outer diameter De, so that there will be substantially no welding margin and it may be difficult to weld the end portions to each other. Further, if the ratio Le/De is larger than 2.4, the length Le of the flow path extension portion 4b is larger than the pipe outer diameter De, so that a problem that the pulling out of the core pins 51 and 52 is disrupted or it will be necessary to cut the end portions during piping cannot be sufficiently eliminated.

From the same point of view, a ratio of a length Lt between the two welding end portions 3b, 3c linearly communicated with the flow path branching portion 4a via the two flow path extension portions 4b (the total length of the internal flow path P along the central axis C2 of the base portion Pa) to a pipe outer diameter De at the flow path extension portion 4b of the joint body portion 2 (Lt/De) may preferably be from 1.9 to 8.0. In other words, if the ratio Lt/De is less than 1.9, the length Lt between the two welding end portions 3b, 3c is too small relative to the pipe outer diameter De, so that the welding of the welding end portions 3a-3c may be difficult, depending on the shape of the clamping jig of the welding machine and the like. That is, it is concerned that when the welding end portions 3a, 3b or 3c of the resin pipe joint 1 held by the clamp jig are heated by the heater or the like, a larger amount of heat is transmitted to the clamp jig side, so that the welding end portions 3a-3c are hardly melted, because a distance between the end face of the welding end portions 3a, 3b or 3c and the front face of the clamp jig on the heater side is excessively short (that is, a portion of the welding end portion 3a, 3b or 3c protruding from the front face of the clamp jig is too short). On the other hand, if the ratio Lt/De exceeds 8.0, the length Lt between the two welding end portions 3b, 3c is too long relative to the pipe outer diameter De, whereby it may be difficult to pull off, particularly the base portion core pin 51, or the cutting of the end portions may be required for constructing the piping.

More particularly, it is found that at least the resin pipe joint 1 having the length Lt between the two welding end portions 3b, 3c in a range of from 25 mm to 50 mm and having the length Le of the flow path extension portion 4b of 1 mm or more can be produced because it allows reliable pulling out of the core pins 51 and 52, based on the molding results. However, even if the resin pipe joint is that having the length Lt between the two welding end portions 3b, 3c and the length Le of the flow path extension portion 4b beyond the above ranges, it would be able to be produced.

Here, as in the illustrated embodiment, for example, when the flow path branching portion 4a and the flow path extension portion 4b can be distinguished from each other based on their outer shapes such as in the case where a step S between the flow path branching portion 4a and the flow path extension part 4b is observed based on the outer shape of the joint body portion 2, the region of flow path extension portion 4b is determined based on the distinction on the basis of their outer shapes. On the other hand, if their outer shapes cannot be distinguished, the region of the flow path extension portion is considered to be an area whose outer shape is straight, that is, an area before its outer shape is curved or bent due to the branching and the like or before the outer diameter changes.

FIGS. 5A-B and 6A-B show resin pipe joints 11 and 21 according to the other embodiments.

Figure 5A:
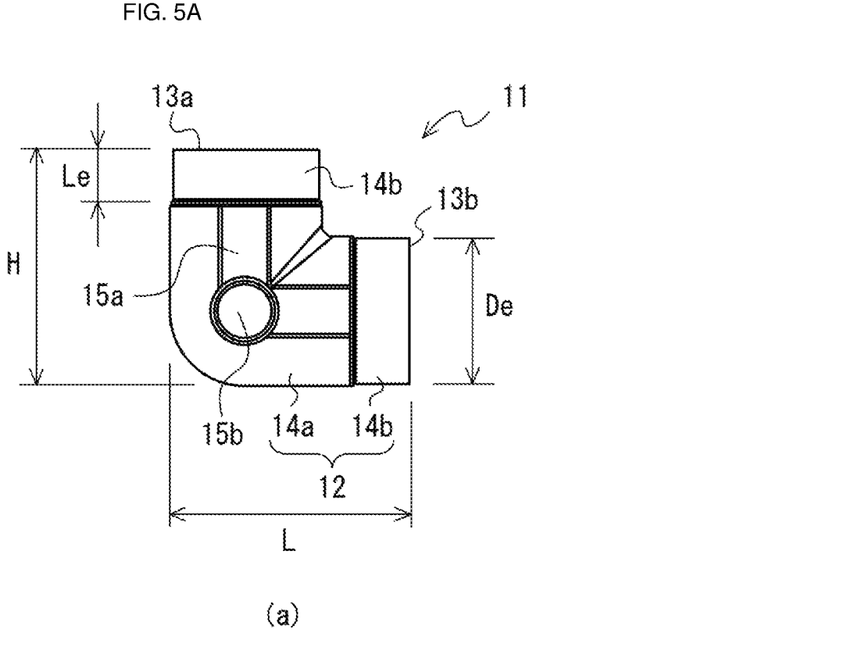
FIG. 5A is a plan view showing a resin pipe joint according to another embodiment.
Figure 5B:
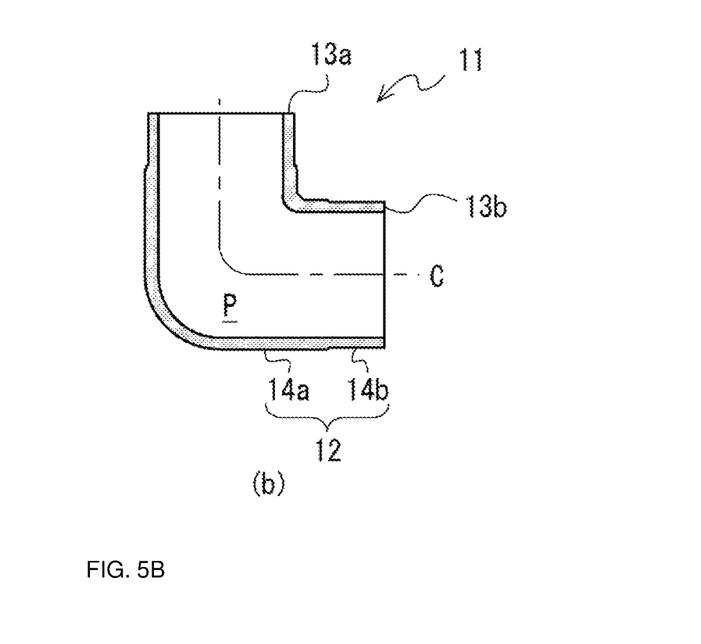
FIG. 5B is a cross-sectional view including a central axis of an internal flow path.

The resin pipe joint 11 shown in FIGS. 5A, 5B includes a joint body portion 12 and two welding end portions 13a, 13b. The joint body portion 12 is comprised of a flow path bending portion 14a that bends an internal flow path P at a bending angle of 90°; and two flow path extension portions 14b that linearly extend so as to communicate with the two welding end portions 13a, 13b from the flow path bending portion 14a, respectively.

Figure 6A:
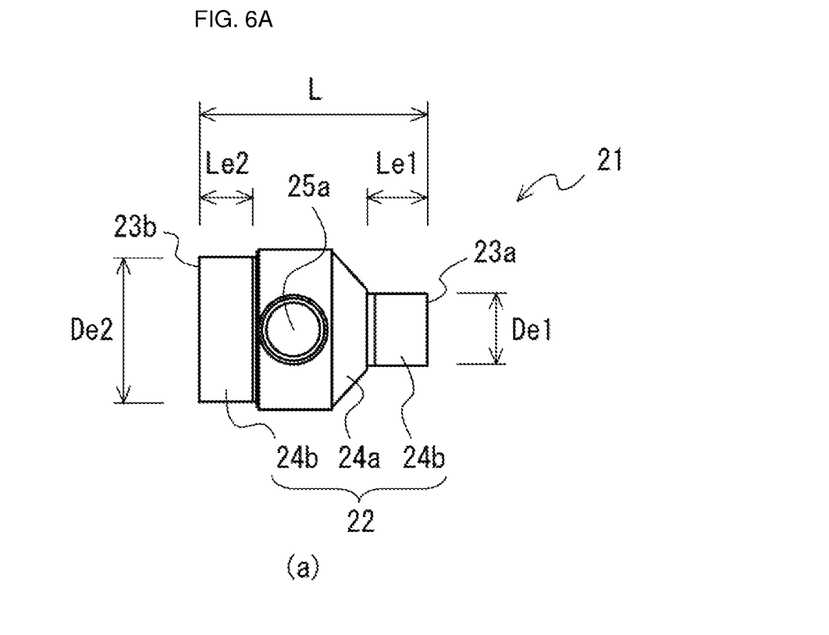
FIG. 6A is a plan view showing a resin pipe joint according to still another embodiment.
Figure 6B:
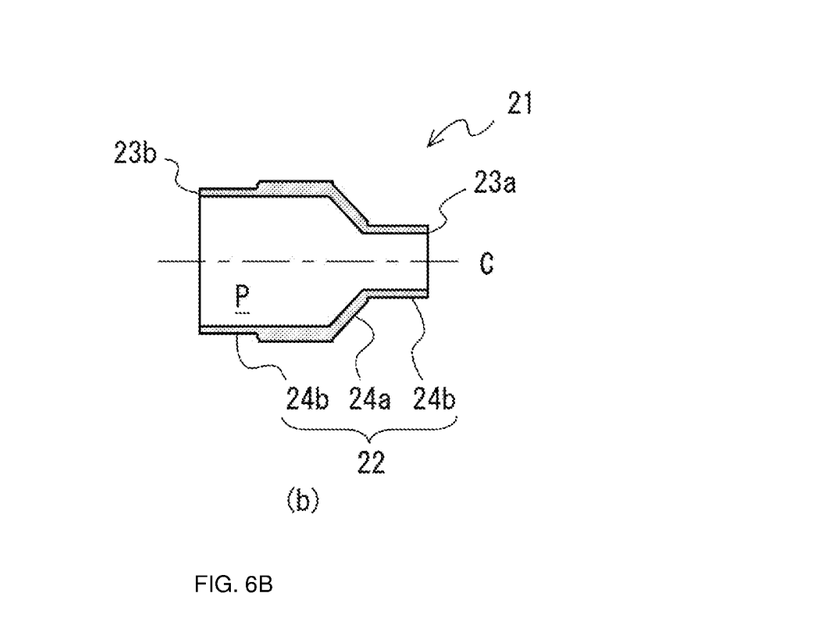
FIG. 6B is a cross-sectional view including a central axis of an internal flow path.

The resin pipe joint 21 shown in FIGS. 6A and 6B includes a joint body portion 22 and two welding end portions 23a, 23b having different inner and outer diameters. The joint body portion 22 is comprised of a flow path diameter changing portion 24a having tapered inner and outer diameters in order to gradually change a diameter of an internal flow path P; and two flow path extension portions 24b linearly extending so as to communicate an internal flow path P with the two welding end portions 23a, 23b from the flow path diameter changing portion 24a, respectively.

For such resin pipe joints 11, 21, the flow path cross-sectional area of each joint body portion 12, 22 is also constant in each flow path extension portion 14b, 24b which is adjacent to the welding end portion 13a, 13b, 23a, 23b and whose outer diameter is straight, and the pipe inner wall surface of the flow path extension portion 14b, 24b is formed in a straight line shape parallel to the central axis C in the cross section including the central axis C of the internal flow path P.

This can allow effective prevention of unintentional fluctuation of the flow rate of the fluid at the flow path extension portion 14b, 24b and liquid pool generated at the portions welded to the resin tube member or the like, so that good flowing of the fluid in the internal flow path P can be achieved.

Although not shown, the production of the resin pipe joint 11 shown in FIGS. 5A and 5B can be carried out by placing two non-tapered columnar core pins in a predetermined shaped cavity of an injection molding die so as to bring the tips of the core pins close to each other in a direction forming a substantially right angle, curing a resin in the cavity, and then sequentially pulling out the core pins.

Although not shown, the production of the resin pipe joint 21 shown in FIGS. 6A and 6B can be carried out by placing a single core pin having a shape corresponding to the shape of the internal flow path P of the resin pipe joint 21 in a cavity having a predetermined shape. This core pin for the resin pipe joint 21 forms a columnar shape and is not tapered in a portion other than the intermediate diameter changing portion whose diameter changes. After curing the resin in the cavity, the core pin can be pulled out from the welding end portion 23b having a larger inner diameter to form the resin pipe joint 21.

As with the resin pipe joint 1 as described above, it is also preferable that in the resin pipe joints 11 and 21 shown in FIGS. 5A-B and 6A-B, a ratio of each length Le, Le1, Le2 of each flow path extension portion 14b, 24b along the central axis C of the internal flow path P to each pipe outer diameter De, De1, De2 at the flow path extension portion of each joint body portion 12, 22 (Le/De) is from 0.29 to 2.4, in terms of the pull-out property of the core pine and the like. More particularly, it is preferable that each length Le of each flow path extension portion 14b, 24b along the central axis C of the internal flow path P is 1 mm or more.

Examples of materials for forming the resin pipe joints as described above include perfluoroalkoxy alkane (PFA), a perfluoroethylene-propene copolymer (FEP), polyether ether ketone (PEEK) and the like, but any material other than those listed above may be used.

In the resin pipe joint 1 shown in FIGS. 1 to 3, the outer surface of the flow path branching portion 4a of the joint body portion 2 is provided with a T-shaped protruding portion 5a extending in parallel with the central axes C1 and C2 of the base portion Pa and the branched portion Pb of the internal flow path P, as well as the above outer surface is also provided with a circular protruding portion 5b that projects beyond the T-shaped protruding portion 5a, on a straight line orthogonal to the central axes C1 and C2 at a crossing position of the central axes of the base portion Pa and the branched portion Pb of the internal flow path P.

Also, in the resin pipe joint 11 shown in FIGS. 5A, 5B, the outer surface of the flow path bending portion 14a of the joint body portion 12 is provided with an L-shaped protruding portion 15a extending in parallel with the central axis C of the internal flow path P, and the bent portion of the L-shaped protruding portion 15a is provided with a circular protruding portion 15b protruding beyond the L-shaped protruding portion.

Further, in the resin pipe joint 21 shown in FIGS. 6A, 6B, a circular protruding portion 25a is provided on the outer surface of the flow path diameter changing portion 24a of the joint body portion 22.

These protruding portions serve to be able to reliably position and hold the resin pipe joints 1, 11, 21 to the clamp jigs of the welding machine when welding the end portions to the resin tube members or other resin tube members.

Examples

The resin pipe joints according to this invention were experimentally produced. The resin pipe joints are described below. However, the description herein is merely for the purpose of illustration and is not intended to limit this invention.

As the resin pipe joint (so-called cheese type joint) as shown in FIGS. 1 and 2, samples 1 to 16 were produced by means of injection molding using two non-tapered core pins as shown in FIG. 4. The length (total length) Lt between the two welding end portions, the total height H, and the pipe outer diameter (outer diameter) De at the flow path extension portion of the joint body portion of each of samples 1 to 16 were as shown in Table 1. It should be noted that in Table 1, D1 and D3 mean the pipe outer diameters at the flow path extension portions forming the base portion of the internal flow path, and D2 means the pipe outer diameter at the flow path extension portion forming the flow path branching portion of the internal flow path.

TABLE 1

| Sample No. | Total Length Lt (mm) | Total Height H (mm) | Outer Diameter De (mm) | | |
|---|---|---|---|---|---|
| | | | D1 | D2 | D3 |
| 1 | 25 | 15.085 | | 3.17 | |
| 2 | 27 | 17.675 | | 6.35 | |
| 3 | 30 | 20.76 | 9.52 | 6.35 | 9.52 |
| 4 | 30 | 20.76 | | 9.52 | |
| 5 | 35 | 24.85 | 12.7 | 6.35 | 12.7 |
| 6 | 35 | 24.85 | 12.7 | 9.52 | 12.7 |
| 7 | 35 | 24.85 | | 12.7 | |
| 8 | 45 | 33.025 | 19.05 | 6.35 | 19.05 |
| 9 | 45 | 33.025 | 19.05 | 9.52 | 19.05 |
| 10 | 45 | 33.025 | 19.05 | 12.7 | 19.05 |
| 11 | 45 | 33.025 | | 19.05 | |
| 12 | 50 | 38.7 | 25.4 | 6.35 | 25.4 |
| 13 | 50 | 38.7 | 25.4 | 9.52 | 25.4 |
| 14 | 50 | 38.7 | 25.4 | 12.7 | 25.4 |
| 15 | 50 | 38.7 | 25.4 | 19.05 | 25.4 |
| 16 | 50 | 38.7 | | 25.4 | |

As the resin pipe joint (so-called elbow) as shown in FIGS. 5A, 5B, samples 17 to 29 were produced by means of injection molding using two non-tapered core pins as described above. The total length Lt, the total height H, and the pipe outer diameter (outer diameter) De at the flow path extension portion of the joint body portion of each of samples 17 to 29 were as shown in Table 2. It should be noted that in Table 2, D1 means the pipe outer diameter at the flow path extension portion on the total height H side, and D2 means the pipe outer diameter at the flow path extension portion on the total length L side.

TABLE 2

| Sample No. | Total Length L (mm) | Total height H (mm) | Outer Diameter De (mm) | |
|---|---|---|---|---|
| | | | D1 | D2 |
| 17 | 15.085 | 15.085 | | 3.17 |
| 18 | 17.675 | 17.675 | | 6.35 |
| 19 | 19.175 | 20.76 | 9.52 | 6.35 |
| 20 | 20.76 | 20.76 | | 9.52 |
| 21 | 21.675 | 24.85 | 12.7 | 6.35 |
| 22 | 24.85 | 24.85 | | 12.7 |
| 23 | 26.675 | 33.025 | 19.05 | 6.35 |
| 24 | 29.85 | 33.025 | 19.05 | 12.7 |
| 25 | 33.025 | 33.025 | | 19.05 |
| 26 | 29.175 | 38.7 | 25.4 | 6.35 |
| 27 | 32.35 | 38.7 | 25.4 | 12.7 |
| 28 | 35.525 | 38.7 | 25.4 | 19.05 |
| 29 | 38.7 | 38.7 | | 25.4 |

As the resin pipe joint (so-called reducer) as shown in FIGS. 6A, 6B, samples 30 to 40 were produced by means of injection molding using one non-tapered core pin as described above. The total length Lt, and the pipe outer diameters (outer diameters) De1 and De2 at the flow path extension portions of the joint body portion of each of samples 30 to 40 were as shown in Table 3.

TABLE 3

| Sample No. | Total Length L (mm) | Outer Diameters De1, De2 (mm) | |
|---|---|---|---|
| | | De1 | De2 |
| 30 | 30 | 3.175 | 6.35 |
| 31 | | 6.35 | 9.52 |
| 32 | | 6.35 | 12.7 |
| 33 | | 9.52 | 12.7 |
| 34 | | 6.35 | 19.05 |
| 35 | | 9.52 | 19.05 |
| 36 | | 12.7 | 19.05 |
| 37 | | 6.35 | 25.4 |
| 38 | | 9.52 | 25.4 |
| 39 | | 12.7 | 25.4 |
| 40 | | 19.05 | 25.4 |

In view of the foregoing, it was found that the resin pipe joints in which the flow path cross-sectional area was constant at the predetermined portions could be produced as shown in Tables 1 to 3.

DESCRIPTION OF REFERENCE NUMERALS 1, 11, 21 resin pipe joint
2, 12, 22 joint body portion
3a-3c, 13a-13c, 23a-23c welding end portions
4a flow path branching portion
14a flow path bending portion
24a flow path diameter changing portion
4b, 14b, 24b flow path extension portion
5a T-shaped protruding portion
15a L-shaped protruding portion
5b, 15b, 25b circular protruding portion
51, 52 core pin
P internal flow path
Pa base portion of internal flow path
Pb branched portion of internal flow path
A1-A3 opening portion
Lt length between two welding end portions
Le, Le1, Le2 length of flow path extension portion
De, De1, De2 pipe outer diameter at flow path extension portion of joint body portion
C1, C2, C central axis

What is claimed is:
1. A resin pipe joint comprising:
a tubular body portion defining an internal flow path of constant cross-sectional area between at least two opening portions, each of the opening portions terminating an extension portion having an extension length Le, each of the opening portions defining a welding end portion, each of the extension portions having a constant cross-sectional area and an outside diameter De;

wherein a pipe joint length Lt is defined between two of the welding end portions;

wherein the body portion defines at least one of a first predetermined ratio Le/De and a second predetermined ratio Lt/De; and wherein an outer surface of the body portion has at least one T-shaped protruding portion extending parallel to a central axis of the internal flow path.

2. The resin pipe joint of claim 1, wherein the body portion comprises:
a flow path branching portion that branches the internal flow path into two or more branches;
wherein each of the extension portions extends so as to communicate the internal flow path from the flow path branching portion to each of the welding end portions.

3. The resin pipe joint of claim 2, wherein the internal flow path has a cross-sectional area that is constant over the flow path branching portion and the extension portions of the body portion.

4. The resin pipe joint of claim 1, wherein each extension portion has an inner wall surface that is formed in a straight line shape parallel to a central axis of the internal flow path at the extension portion.

5. The resin pipe joint of claim 1, wherein the first predetermined ratio is 0.29 to 2.4.

6. The resin pipe joint of claim 1, wherein the second predetermined ratio is 1.9 to 8.0.

7. The resin pipe joint of claim 1, wherein the pipe joint length Lt is 25 mm to 50 mm.

8. The resin pipe joint of claim 1, wherein the extension length Le is at least 1 mm.

9. The resin pipe joint of claim 1, wherein the resin pipe joint comprises a material selected from the group consisting of perfluoroalkoxy alkane (PFA), a perfluoroethylene-propene copolymer (FEP), and polyether ether ketone (PEEK).

10. A resin pipe joint comprising:
a tubular body portion defining an internal flow path of constant cross-sectional area between at least two opening portions, each of the opening portions terminating an extension portion having an extension length Le, each of the opening portions defining a welding end portion, each of the extension portions having a constant cross-sectional area and an outside diameter De;

wherein the body portion defines a predetermined ratio Le/De; and wherein an outer surface of the body portion has at least one L-shaped protruding portion extending parallel to a central axis of the internal flow path.

11. The resin pipe joint of claim 10, wherein the body portion comprises:
a flow path bending portion that bends the internal flow path;
wherein each of the extension portions extends so as to communicate the internal flow path from the flow path bending portion to each of the welding end portions.

12. The resin pipe joint of claim 11, wherein the flow path has a cross-sectional area that is constant over the flow path bending portion and the extension portions of the body portion.

13. The resin pipe joint of claim 10, wherein each extension portion has an inner wall surface that is formed in a straight line shape parallel to a central axis of the internal flow path at the extension portion.

14. The resin pipe joint of claim 10, wherein the predetermined ratio Le/De is 0.29 to 2.4.

15. The resin pipe joint of claim 10, wherein the extension length Le is at least 1 mm.

16. The resin pipe joint of claim 10, wherein the resin pipe joint comprises a material selected from the group consisting of perfluoroalkoxy alkane (PFA), a perfluoroethylene-propene copolymer (FEP), and polyether ether ketone (PEEK).

* * * * *